Dec. 9, 1958 H. BAADE 2,863,674
ASSEMBLY FOR FIFTH-WHEEL CONNECTION
Filed Oct. 28, 1957 5 Sheets-Sheet 1

INVENTOR.
HENRY BAADE

Dec. 9, 1958  H. BAADE  2,863,674
ASSEMBLY FOR FIFTH-WHEEL CONNECTION
Filed Oct. 28, 1957  5 Sheets-Sheet 2

INVENTOR.
HENRY BAADE
BY

Dec. 9, 1958 H. BAADE 2,863,674
ASSEMBLY FOR FIFTH-WHEEL CONNECTION
Filed Oct. 28, 1957 5 Sheets-Sheet 3

INVENTOR.
HENRY BAADE
BY

Dec. 9, 1958          H. BAADE          2,863,674

ASSEMBLY FOR FIFTH-WHEEL CONNECTION

Filed Oct. 28, 1957          5 Sheets-Sheet 4

INVENTOR.
HENRY BAADE

Dec. 9, 1958   H. BAADE   2,863,674
ASSEMBLY FOR FIFTH-WHEEL CONNECTION
Filed Oct. 28, 1957   5 Sheets-Sheet 5
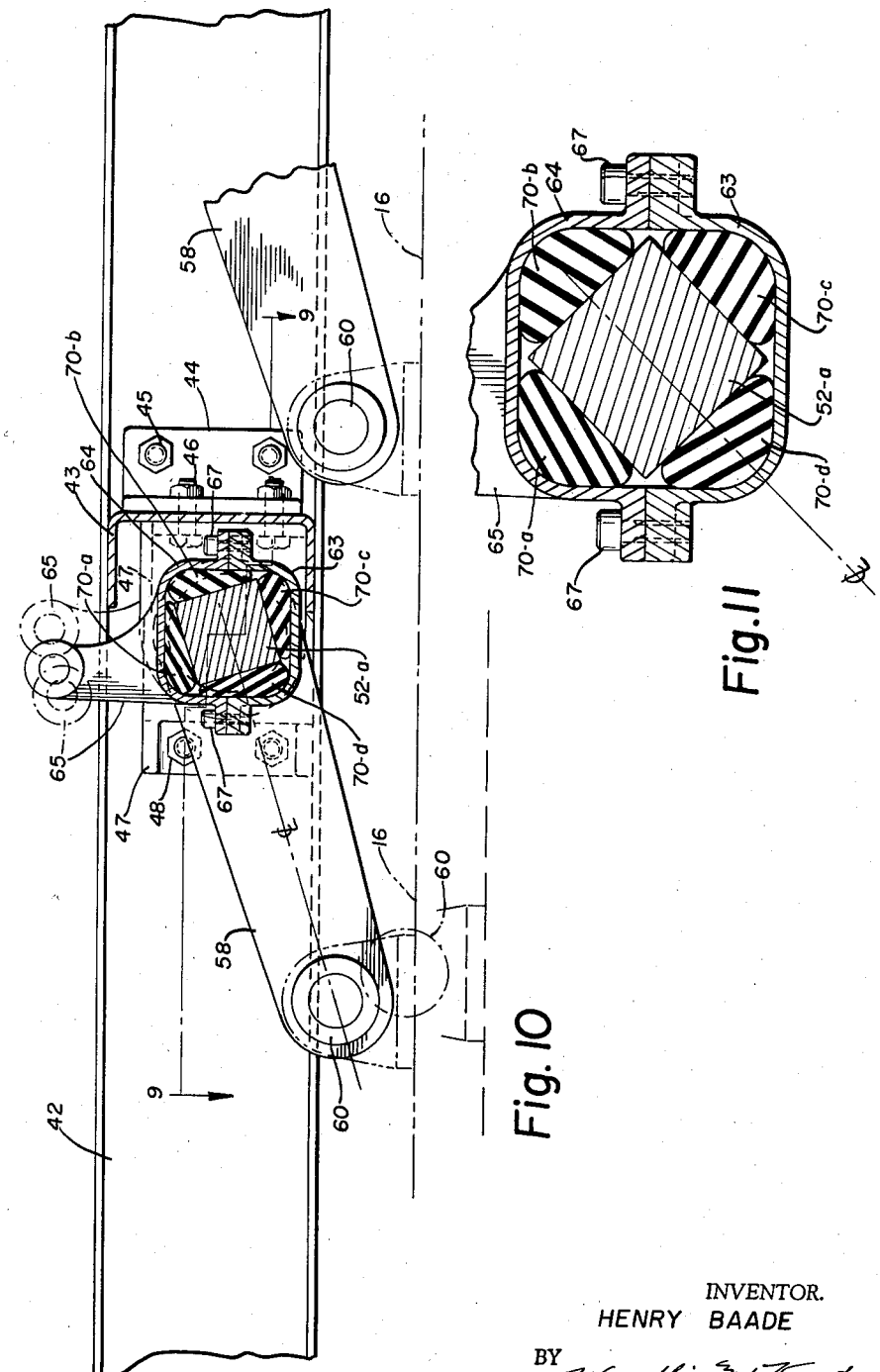
INVENTOR.
HENRY BAADE
BY

United States Patent Office 2,863,674
Patented Dec. 9, 1958

2,863,674

ASSEMBLY FOR FIFTH-WHEEL CONNECTION

Henry Baade, East Cleveland, Ohio, assignor to Curtis Manufacturing Company, a corporation of Missouri Application October 28, 1957, Serial No. 693,503

25 Claims. (Cl. 280—439)

My invention relates to fifth wheel connections between an automotive tractor and a trailer drawn by the tractor. This application is a continuation-in-part of my pending application Serial No. 608,600, filed September 7, 1956.

An object of my invention is to provide an improved assembly for providing resiliency between the fifth-wheel connecting a tractor and trailer and the trailer.

Another object is the provision for resilient yielding between a trailer and the fifth-wheel assembly connecting the trailer and automotive tractor.

Another object is the provision for permitting vertical "play" between an automotive tractor and a trailer drawn thereby.

Another object is the provision for applying the resilient yieldability of torsion rods for accommodating vertical "play" or up and down movement between an automotive tractor and a trailer drawn thereby.

Another object is the provision for affording yieldable resistance to vertical movement between a trailer and tractor in one direction and for providing a dampening action to movement in an opposite direction.

Another object is to provide unique and useful results in a new manner.

Another object is to provide for resilient resistance to vertical movement between a trailer and a tractor.

Another object is the provision for obtaining adjustment of resiliently yieldable resistance to vertical movement of the upper end of a trailer relative to the tractor upon which it is carried.

Other objects and a fuller understanding of the invention may be had by referring to the following detailed description and claims, taken in conjunction with the accompanying drawing, in which:

Figure 10 is a longitudinal view of the modified apparatus shown in Figure 9 and illustrating the disposition of the parts lengthwise of the trailer; and Figure 11 is an enlarged sectional view taken through the line 11—11 of Figure 9.

Figure 1:
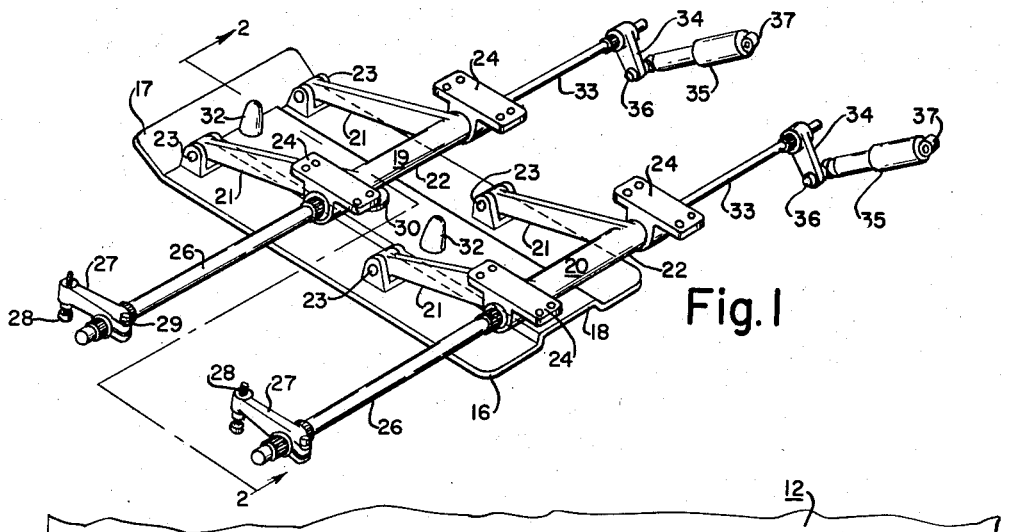
Figure 1 is a perspective view of the apparatus embodying my invention and removed from the tractor and trailer assembly.

In the drawings, the automotive tractor is denoted generally by the reference character 11. This automotive tractor has a frame 13 extending rearwardly and between its rear wheels. The tractor 11 is of the well-known type utilized for supporting the forward end of a trailer and for drawing the trailer through a fifth-wheel connection. In the drawing, the trailer, of which the forward portion is shown, is generally denoted by the reference character 12.

Mounted upon the frame 13 of the tractor by laterally disposed trunnions 15 is a supporting plate 14 which constitutes a lower fifth-wheel part. Each fifth wheel has two parts which revolve relative to each other in a horizontal plane. A plate 14 constitutes the lower of these parts which is carried by the tractor.

Figure 2:
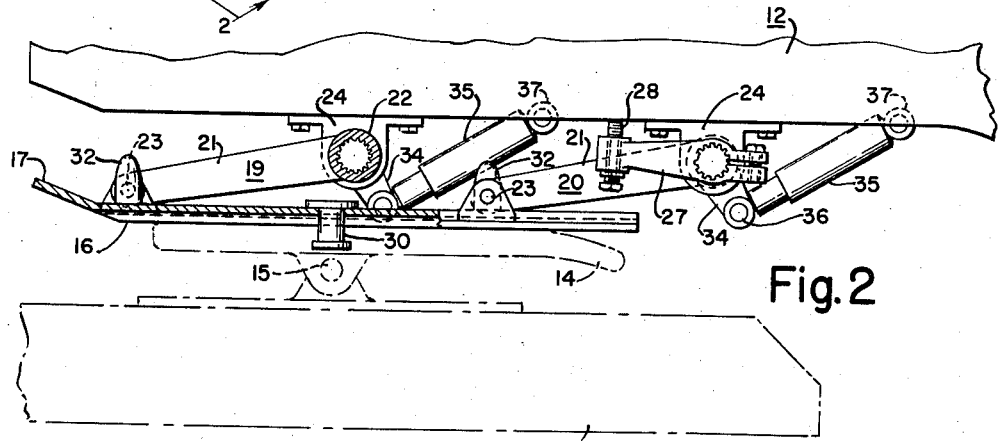
Figure 2 is a side view of the apparatus embodying my invention taken through the line 2—2 of Figure 1, and shown mounted in a fifth-wheel arrangement between an automotive tractor and a trailer.

The lower fifth-wheel part 14 has a slot 31 extending from its rearward edge for accommodating a king pin. As in the usual manner on assembly of the trailer and tractor, the king pin moves fowardly in the slot to its position in the central portion of the lower fifth-wheel part 14 and there is locked against removal in an appropriate manner. The rearward end of the plate 14 is slightly inclined as shown in Figure 2 for the ready assembly of the two parts of the fifth wheel.

My apparatus has an upper fifth-wheel part or table member 16 which is adapted to engage and rest upon the upper surface of the supporting plate 14. A king pin 30 welded to the table member 16 extends downwardly therefrom so as to interfit in the usual arrangement with the supporting plate 14. The king pin 30 provides a vertical pivot around which the table member 16 may revolve relative to the support plate 14. The table member 16, because it interengages with and revolves relative to the lower fifth-wheel part 14, is referred to as the upper fifth-wheel part.

The forward end of the table member 16 is inclined at 17 so as to facilitate the joining of the parts 14 and 17. The plate 16 is formed to have a raised central portion 18 extending therealong to provide rigidity and strength thereto.

Two U-shaped members 19 and 20 are positioned over the upper fifth-wheel part 16 in a manner shown in the drawings. Each U-shaped member has two parallel arms or links 21 joined by a cylindrical base portion 22. The two arms 21 extend forwardly and downwardly from the cylindrical base portion 22 of each of the two U-shaped members 19 and 20. The forward lower end of each arm 21 is connected by a pivot connection 23 to the upper fifth-wheel part 16. The axis of the pivot connections 23 for the forward U-shaped member 19 is spaced from, and is parallel to, the axis of the pivot connections 23 for the rearward U-shaped member 20.

The cylindrical base portion 22 of each U-shaped member is pivotally connected by two brackets 24 which are secured by bolts at the bottom of the forward portion of the trailer 12. One pair of brackets 24 embrace the cylindrical base portion 22 of the forward U-shaped member 19 and another pair of brackets 24 embraces the cylindrical base portion 22 of the rearward U-shaped member 20.

A torsion rod 26 is splined to each cylindrical base portion 22 so as to be non-rotatively engaged therewith and so as to be disposed along an axis coinciding with the axis of the cylindrical base portion to which it is splined. Each torsion rod 26 extends laterally of the trailer a distance from the respective U-shaped member and to a location adjacent the side of the trailer. Splined to each torsion rod 26 adjacent its outer end near the side of the trailer is an arm 27. Rotation of the torsion rod 26 tends to swing the arm 27 carried thereby in an arc about the axis of the torsion rod 26. A clamping bolt 29 holds each arm in tight splined engagement with its respective torsion rod 26. At the free end of each arm 27, there is an adjusting bolt 28 adapted to abut against the bottom of the trailer. By turning the adjusting bolts 28, the permissive amount of swinging of each arm 27 toward the bottom of the trailer may be adjustably determined.

Splined to the other end of each of the U-shaped members 19 and 20 is a torque transmitting rod 33 which extends toward the other side of the trailer. A splined connection between the U-shaped members and the rods 33 is such that the rods 33 are non-rotatively secured to the U-shaped members and such that the rods 33 are each disposed on an axis coinciding with the axis of the cylindrical base portion 22 of the U-shaped member to which it is connected. Adjacent the free end of each of the two rods 33 by a splined connection is an arm 34. The mounting of the arm 34 on the respective rod 33 is such that rotation of the rod 33 tends to swing the arm 34 in an arc around the axis of the rod 33.

Dampening devices 35 are provided for each of the two arms 34 carried by the two rods 33. The lower and forward end of each dampening device 35 is pivotally connected by a pivot pin 36 to a respective arm 34. The upper and rearward end of each dampening device 35 is pivotally connected at 37 to the bottom of the trailer. Each dampening device is constructed to retard contraction or shortening of the effective link of the dampening device. In other words, each dampening device 35 cushions sudden movement of an arm 34 upwardly and rearwardly towards the trailer and thus cushions and retards rotative movement of the rods 33 in a counter-clockwise direction as seen in Figure 2. Each dampening device 35 preferably is of the direct-acting hydraulic type. However, pneumatic or scissors action friction types of dampening devices may be utilized as the dampening device 35. Because the details of the internal structure of the dampening device are not a part of my invention, this detail has not been shown.

Adjacent the opposite ends of the cylindrical base portion 22 of each U-shaped member is a splined bushing 25. These splined bushings 25 are journaled in the respective bracket supports 24 so that the bushings 25 freely rotate within the brackets 24. On one end of each cylindrical base portion 22, the splined bushing 25 within a housing 24 is splined to the torsion rod 26 extending from that end of the cylindrical base portion 22. On the other end of the cylindrical base portion 22, a splined bushing 25 within a bracket 24 is also splined to a rod 33. By means of the connections between the brackets 24, the splined bushings 25, a base portion 22, and the oppositely extending rods 26 and 33, there is provided a pivot support for each U-shaped member, the axis of this pivot support coinciding with the axis of the respective rods 26 and 33.

The outer free ends of the rods 26 and 33 adjacent the lateral sides of the trailer 12 are suitably supported by supports 38 and 39, support 38 being provided for rod 26 and support 39 being provided for rod 33. The engagement of the rods 26 and 33 with their respective supports 38 and 39 are such as to permit rotation of these rods relative to the supports.

Downward movement of the forward end of the trailer 12 toward the upper fifth-wheel part 16 tends to move the axle of the cylindrical base portion 22 of the two U-shaped members downwardly toward the upper fifth-wheel part 16. The arms 21 of the forward and rearward U-shaped members are maintained parallel by the fixed pivot connections at the opposite ends of the arms 21. As seen in Figure 2, the forward and rearward arms 21 having fixed pivot connections with the upper fifth-wheel part 16 and the trailer 12 provides the action of a parallelogram. Swinging of the arms 21 on their respective pivots maintains the parallel relationship between the bottom surface of the trailer 12 and the horizontal surface of the upper fifth-wheel part 14. By this parallelogram action, the relative parallel position of the fifth-wheel assembly and the trailer is maintained during relative up and down movement between the fifth-wheel assembly and the trailer.

Rubber bumpers 32 are provided on the upper surface of the fifth-wheel part 16 to meet any possible movement of the trailer downwardly to that extent.

By the arrangement, movements which shorten the distances between the bottom of the trailer and the top of the fifth-wheel part 16 causes rotation of the torsion rods 26 at their inner ends where they are splined to the cylindrical base portion 22 of the respective U-shaped members. This rotative action to the torsion rods 26 tends to be transmitted to the entire length of the torsion rods 26. However, by reason of the engagement of the adjusting bolts 28 with the bottom of the trailer, the arms 27 are prevented from swinging upwardly and thus the rotation of the torsion rods 26 at their outer ends is prevented. The resistance to torque of the outer ends of the arms 26 imparts a resilient torsion to the rods 26 so that the opposing forces on the rod 26 are accommodated by the yieldable torsion of the twisting of the rods 26. The material of which the rods 26 are made is such as heat-treated spring steel of an appropriate alloy, such as to permit the rods 26 to resume their unrestrained or untwisted condition after the application of opposing forces to the opposite ends of the rods 26 is terminated. In effect, these rods 26 will provide a resilient opposition to the downward movement of the trailer relative to the fifth-wheel part 16. The expression of downward movement of the trailer relative to the fifth-wheel part 16 also includes the upward movement of the fifth-wheel part 16 relative to the trailer. In other words, movement of the trailer and fifth-wheel part 16 toward each other tends to compressively twist the resiliently yieldably torsion rods 26 whereas movement of the trailer and fifth-wheel part 16 away from each other in a vertical direction tends to relieve the torsional twisting to which the resilient torsion rods may be subjected.

Sudden movement of the trailer and fifth-wheel assembly in a vertical direction is retarded by the dampening devices 35. Relative movement of the trailer and fifth-wheel assembly part tends to rotate the rods 33 in a direction to swing the arms 34 upwardly toward the trailer and thus to contract or depress the dampening devices 35. A lag to such movement is imparrted by the dampening devices so that any sudden rotation of the rods 33 is retarded.

The amount of dampening desired and the tension to be applied to the dampening devices 35 may be adjusted by uncoupling the dampening devices and adjusting the effective length of the dampening devices. The desired spacing of the parts before torsion of rods 26 commences may be adjusted by turning the adjusting bolts 28. The apparatus disclosed provides a safe and certain connection between an automotive tractor and a trailer and at the same time provides a degree of flexibility between the tractor and trailer to accommodate jars and jolts that may be encountered and provides smoother and safer riding qualities for the trailer. Other advantages and benefits are apparent from the disclosure of my apparatus.

Figure 6:
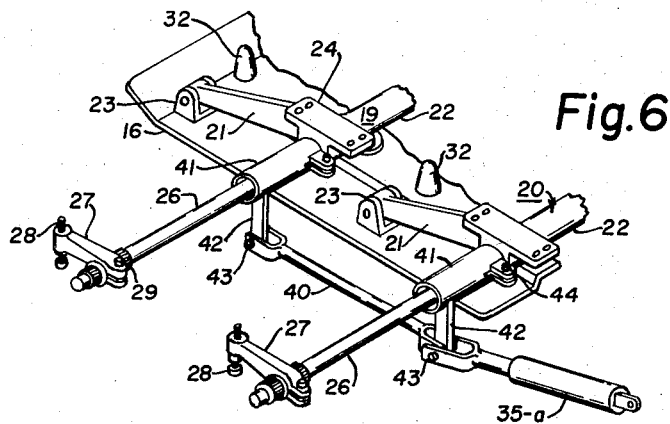
Figure 6 is a perspective view of a portion of apparatus embodying a modification of my invention.
Figure 7:
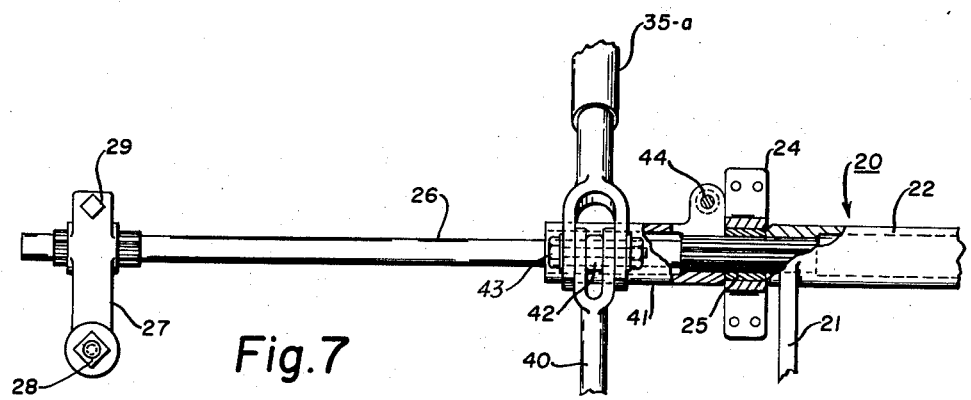
Figure 7 is a bottom view looking upward at a portion of a link-and-rod assembly embodying said modification of my invention.
Figure 8:
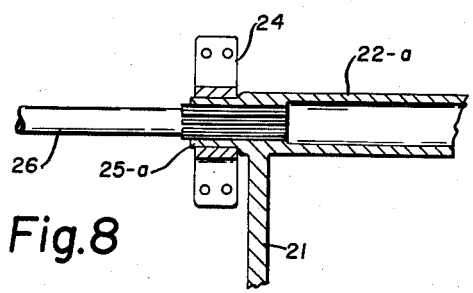
Figure 8 illustrates a variation in the mounting of a link member in apparatus embodying my invention.

A modification in structure of apparatus embodying my invention is shown in Figures 6 and 7. In this modification, an internally splined sleeve 41 is splined to, and non-rotatively engaged with, each splined torsion rod 26 at a location immediately adjacent each pivot support 24. Torque of a rod 26 at this location causes corresponding torque of a sleeve 41. A clamping bolt 44 firmly holds each sleeve 41 in secure position on a respective rod 26.

Extending downwardly from each sleeve 41 and integral therewith is an arm member 42. As each sleeve 41 rotates on the axis of the rod 26 upon which it is mounted, the arm 42 swings in an arc on the axis. The two arms 42 are disposed parallel to each other. A connecting rod 40 has its opposite ends pivotally connected by pins 43 to the ends of arms 42. The rod 40 maintains the arms 42 parallel to each other and also transmits torque of one sleeve 41 and the inner splined end of the rod 26 to which it is mounted to the other sleeve 41 and the inner splined end of the other rod 26 to which it is mounted.

Figure 3:
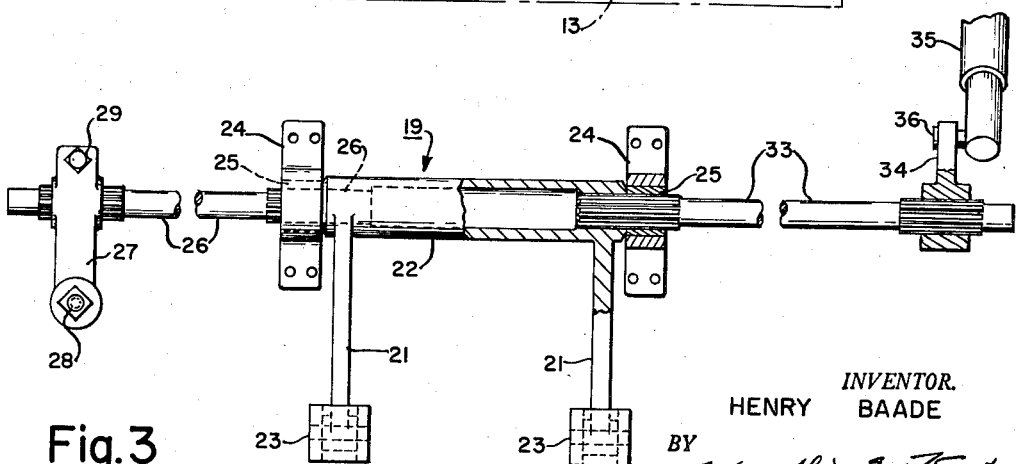
Figure 3 is a bottom view looking upward at one of the link-and-rod assemblies utilized in my apparatus, and partially shown in section.
Figure 4:
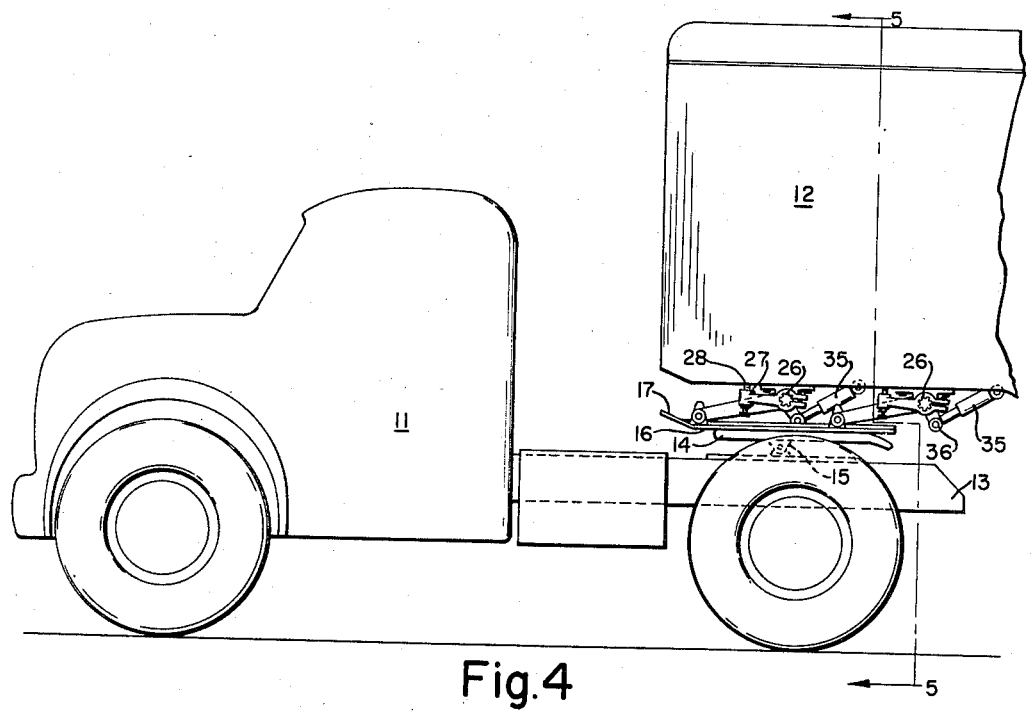
Figure 4 is a side view of an automotive tractor and the forward end of a trailer drawn thereby and illustrating the position of my apparatus therebetween.
Figure 5:
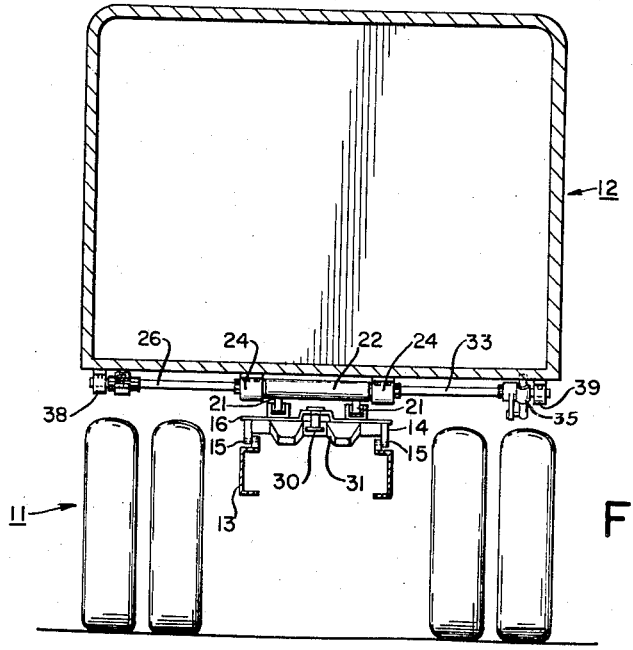
Figure 5 is a cross-sectional view taken through the line 5—5 of Figure 4.

In the arrangement of Figures 6 and 7, the rods 33 on the other end of the cylindrical portions 22 may be eliminated by connecting the dampening device so as to dampeningly oppose movement of arms 42. In this arrangement, the dampening device denoted by the reference character 35–a and similar in structure and function to dampening device 35 in Figures 1, 2 and 3, is connected to pin 43 on the end of connecting rod 40 and end of rearward arm 42. Thus, one dampening device is operatively connected to both rods 26 at their inner ends adjacent the pivot supports 24.

The incorporation of the linkage provided by rod 40 and arms 42 and sleeves 41 aids in securing and maintaining parallel relation of upper fifth-wheel part 16 and the trailer bottom to which brackets 24 are secured. Also, the torque applied by a link 21 to one rod 26 at its inner end immediately adjacent a pivot support 24 is transmitted to the other rod 26 and thus torque is translated from one rod 26 to the other as such torque is produced by pivotal swinging of links 21.

The advantage of having such an interconnection between the rods 26 include the fact that for a light load in the trailer when a softer or less rigid ride is desired, one of the rods 26 may be rendered ineffective and having the remaining torsion rod provide the resilient torsion function formerly rendered by both rods. A torsion rod may be readily rendered ineffective by turning the adjusting screw 28 at the outer end of the rod so that the screw 28 will not abut against the bottom of the trailer and hence so that there is no resistance to rotation of the rod at its outer end.

Another advantage of having the interconnection through connecting rod 40 as described is that a plurality of torsion rods 26 can be interconnected so as to function together when a heavier load is on the trailer. This assures sufficient torsional reaction when required for the heavier loads. When a lighter load is to be carried on the trailer, then one of the plurality of torsion rods may be rendered ineffective. Also, to meet varying operating conditions, such as changes in the oscillations of the road shocks, different torsion bars of varying spring rates may be brought into, or taken out of, operation as described. Flexibility in meeting the needs of the apparatus to properly support is afforded by the modified structure.

Figure 9:
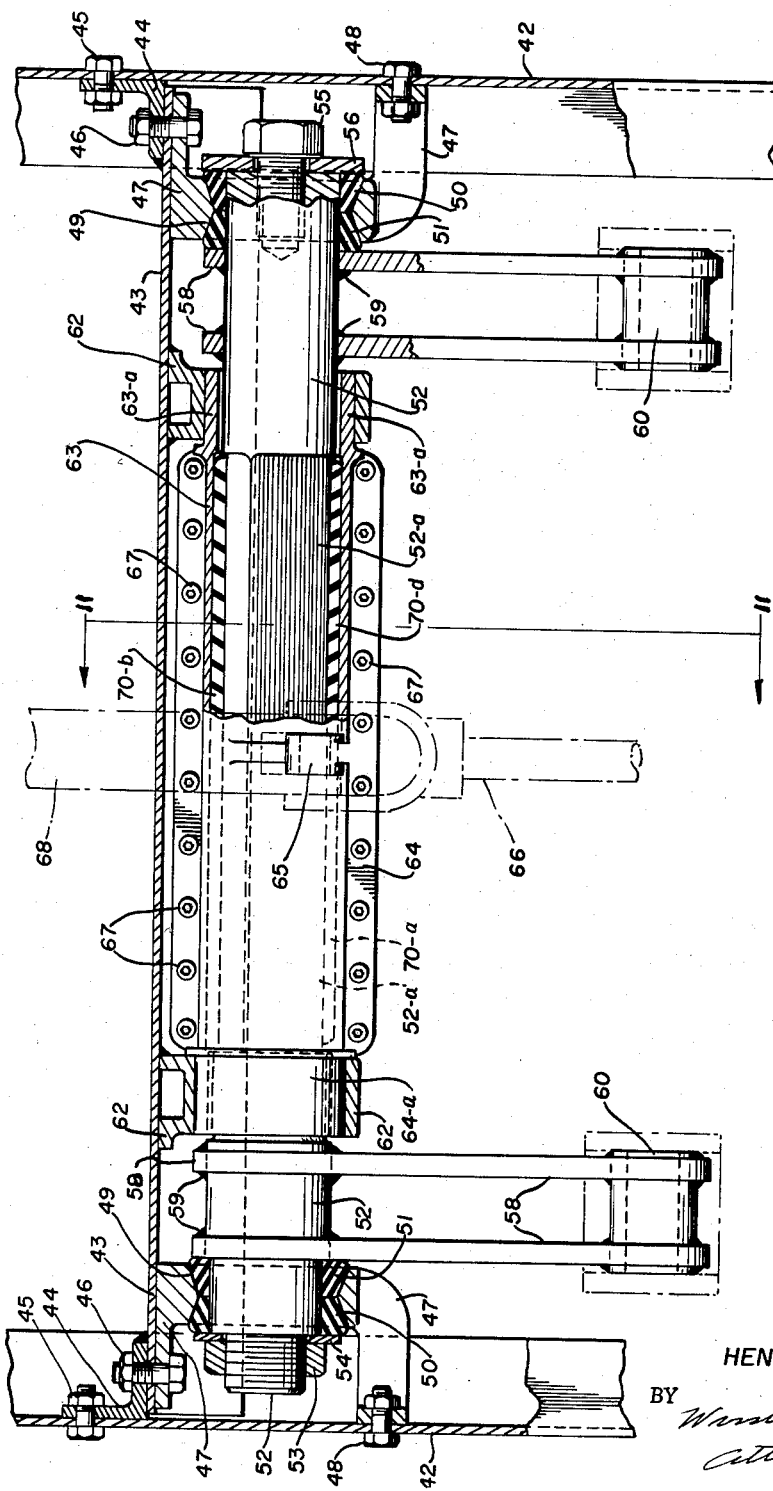
Figure 9 illustrates a modified form of my invention and is taken transversely of the trailer along the line 9—9 of Figure 10, the view being partially in section to better show construction of the apparatus.

In the modified form of the invention illustrated in Figures 9, 10 and 11, I provide resiliently yieldable means of rubber-like material so located and mounted as to resiliently resist movement of the trailer downwardly toward the tractor upon which the trailer is attached. Bolted to the longitudinal frame members 42 extending along the sides of the trailer by means of nut and bolt assemblies 45 is an angle cross-piece 43 extending transversely between the longitudinal frame members 42. This angle cross-piece 43 is carried by the trailer above the fifth-wheel which interconnects the trailer and tractor. There are angle brackets 44 which join the cross-piece 43 with the opposite frame members 42, these angle brackets also bracing the cross-piece 43. Nut and bolt assemblies 46 secure the angle brackets 44 to the opposite ends of the cross-piece 43.

Positioned at the opposite ends of the cross-piece 43 adjacent longitudinal frame members 42 is a U-shaped bracket support 47. The bolt and nut assemblies 46 secure one leg of each bracket 47 to the angle bracket 44 and a nut and bolt assembly 48 secures the other leg of each U-shaped bracket 47 to the frame member 42. These U-shaped brackets have axially aligned openings 49 provided therein as indicated in Figure 9. The axially aligned openings 49 in the U-shaped brackets 47 extend radially inward as they extend axially so that the diameter of the opening 49 intermediate the ends of the opening is smaller than at the outer ends of the opening, as seen in the drawing. Mounted in each opening 49 are a pair of rubber bushings 50 and 51 which are frusto-conical in cross-section so that the bushings at their smaller diameter meet half-way of the ends of the opening 49. Axial pressure on the outer ends of the bushings 50 and 51 compress the bushings and press them toward each other. The bushings 50 and 51 may be of rubber or other suitable resilient rubber-like material.

Extending through the axially aligned openings 49 and mounted in the rubber sleeves 50 and 51, which act as bushings, is a shaft 52. Threadably engaged to one end of the shaft 52 is a nut 53 which holds an annular washer 54, which in turn secures the rubber sleeves or bushings 50 and 51 in position around the shaft at that end. At the other end of the shaft 52, a bolt 55 holds the annular washer 56 against the adjacent rubber sleeve or bushing 50 to hold the rubber sleeves or bushings 50 and 51 at that end of the shaft in position. The shaft 52 is thus provided a bushing support which is resiliently yieldable so as to absorb shocks and vibrations. The pairs of rubber sleeves or bushings 50 and 51 are held under some precompression and provide the desired yieldability of the bushing mounting.

There are two arms 58 which are joined by welds 59 to the shaft 52 adjacent the opposite ends of the shaft 52. Each arm 58 is made up of parallel sections or plates assembled in box form. The ends of the arms 58 opposite from where they are joined to the shaft 52 are connected by pivot connections 60 to the upper fifth-wheel part 16. As seen in Figure 10, there are arms 58 spaced longitudinally of the trailer joined by longitudinally spaced pivot connections 60 to the upper fifth-wheel part 16. As there are two shafts 52 carried by the trailer, each shaft being similar in construction and carrying downwardly extending arms 58, the arrangement provides a parallelogram whereby the upper fifth-wheel part 16 is always maintained parallel to the longitudinal frame members 42 of the trailer as the arms 58 swing on their pivot connections 60 and shaft 52. In other words, the mechanical action of the arms 58 in maintaining the parallel disposition of the parts is similar to the action of the arms 21 in the previously described forms of the invention.

Carried by the cross-piece 43 and spaced transversely of the trailer are two bearing supports 62, the bearing supports being welded to the cross-piece 43. These bearing supports 62 have axially aligned openings extending therethrough.

A housing of generally square cross-section and made up of a lower portion 63 and an upper portion 64 is mounted around the shaft 52. The shaft 52 has an intermediate portion 52–a which is square in cross-section, this square portion 52–a being accommodated within the housing made up of parts 63 and 64. Round portions of the shaft 52 are mounted within the cylindrical openings extending through the bearing supports 62. Also the opposite ends of the housing made up of parts 63 and 64 are cylindrical so as to be accommodated within the cylindrical opening in the respective bearing supports 62 so as to surround the shaft 52 within the bearing support 62. Thus, the shaft 52 may rotate within the round ends 63–a and 64–a of the housing made up of portions 63 and 64 and, in turn, the round ends of the housing may rotate within the openings in the supports 62.

Intermediate of the bearing supports 62, the housing is substantially sqaure in cross-section. Mating flanges of the upper portion 64 and the lower portion 63 of the housing are held together by bolts 67. Extending upwardly from the upper portion 64 of the housing is an arm portion 65 located intermediate the ends of the housing. This upwardly extending arm 65 is pivotally connected with a rod 66 which, in turn, is adapted to be connected to a mechanically or hydraulically actuated adjusting member which may be operated to swing the arm 65 forwardly or rearwardly. Arms 65 extending upwardly from the housing of the two parallel shafts 52 carried by the trailer are interconnected by a tie bar 68. Thus, when one arm 65 swings forwardly of the trailer, the other arm 65 simultaneously swings forwardly a corresponding distance. In this manner both housings around the two parallel shafts 52 are held in the same relative position in respect to a horizontal plane passing through the two shafts 52.

The square cross-section 52–a of the shaft is smaller than the cross-section of the housing made up of portions 63 and 64, so that there is a space between the inner wall of the housing and the outer wall of the shaft. In this space there are positioned elongated rolls or blocks 70–a, 70–b, 70–c and 70–d, these rolls or blocks extending parallel with the shaft 52 and transversely of the trailer. These rolls or blocks are made of rubber or resilient rubber-like material and are resiliently yieldable to compression. Figure 11 illustrates the position of the intermediate portion 52–a of the shaft 52 relative to the housing when the rubber blocks or rolls 70–a, 70–b, 70–c and 70–d are in one condition. Each rubber roll or block, in its free and molded condition and while completely unrestrained, is round in cross-section. When mounted within the housing, each roll or block is substantially triangular in cross-section to fit within the corner of the housing made up of portions 63 and 64. In the relatively unrestrained, but contained, condition of the rubber rolls or blocks in the space provided by the housing and shaft in the relative positions of Figure 11, the rolls or blocks are in the general "triangular" form shown in Figure 11. In this condition of the rolls or blocks, the square portion 52–a of the shaft is out-of-phase with the square interior walls of the housing. In other words, the outer walls of the squared shaft 52–a are disposed at about 45 degrees to the inner walls of the housing. The center line of the arms 58 shown in Figure 10 assumes the angle of the center line indicated in Figure 11 when the rolls or blocks 70–a, 70–b, 70–c and 70–d are in their relatively unrestrained condition of "triangular form." Upon movement of the trailer and its frame members 42 downwardly toward the tractor, the arms or links 58 tend to swing parallel to each other upwardly toward the trailer, such as to the position illustrated in Figure 10. This causes the shaft 52–a to rotate within the housing so as to move its outer walls toward a parallel relationship with the inner walls of the housing. This movement of the shaft 52 from an out-of-phase position toward an in-phase position causes the rolls or blocks 70–a, 70–b, 70–c, and 70–d to squeeze and be kneaded in the space between the shaft and housing. Thus, the rolls or blocks tend to change from the cross-sectional shape shown in Figure 11 to that shown in Figure 10. By reason of the resilient nature of the rubber blocks or rolls, they resist this squeezing and kneading action and are resiliently urged to return to their condition shown in Figure 11. Thus, the center line of the arms 58 are resiliently urged to assume an angle of about 45 degrees to a horizontal plane through the frame members 42.

Downward movement movement of the trailer toward the tractor, thus moving the fifth wheel upwardly toward the trailer, is resiliently resisted by the described action of the rubber rolls or blocks 70–a, 70–b, 70–c and 70–d. A desired resilient action is thus provided to obtain a desired action between the fifth wheel and the trailer during motion of the tractor and trailer over a rough surface.

It is to be understood, of course, that a detailed description of the shaft and its housing with the rubber rolls or blocks resiliently resisting movement therebetween is repeated in that there are two shafts 52, each within a housing and each carrying arms 58, the arms 58 of the forward and rearward shafts together with the fifth wheel making up the parallelogram.

By having the housings interconnected by means of upwardly extending arms 65 and the tie bar 68, the action of the forward and rearward shafts 52 are the same. Also the reference of resistance against the rubber blocks or rolls may be adjusted by rotating the housings about the axis of the shafts, this being done by means of the adjusting rod 66. This adjusting rod, being interconnected with both housings through the respective arms 65, changes the angular disposition of the walls of the housings relative to the shafts within the housings. It is thus possible to obtain the required degree of resilient resistance to the swinging of the arms or links 58 and thus to obtain the desired amount of yieldability to movement of the trailer and tractor toward each other during movement of the vehicles.

The present disclosure includes that contained in the appended claims as well as that in the foregoing description.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a fifth-wheel coupling device for coupling an automotive tractor and trailer, said tractor having a supporting plate carried thereon, the supporting plate being adapted to engage a king-pin, the improvement of a table member adapted to engage the top surface of said supporting plate to be supported thereon and to carry a king-pin adapted to engage said supporting plate, a pair of pivot supports adapted to be mounted to said trailer at the bottom thereof and adjacent the forward end of said trailer, the axes of said pivot supports being parallel and spaced apart longitudinally, and disposed transversely, of the axis of said trailer, a pair of parallel radius members each pivotally connected at one end to said table member and pivotally connected at an opposite end to said pivot supports, respectively, said radius members, table member and pivot supports being arranged in a parallelogram to maintain parallel relationship of said table member and said pivot supports, a pair of torsion rods each pivotally carried by a said pivot support and disposed axially thereof, each said torsion rod being non-rotatively secured to a said radius member at said opposite end thereof, and adjustable engaging means non-rotatively secured to each of said torsion rods at a distance from said radius members, respectively, to limit turning of the said torsion rods at said distance, pivotal movement of said radius members in a direction moving said pivot supports toward said table member being resiliently opposed by said torsion rods.

2. A device adapted to engage a lower fifth-wheel part carried by an automotive tractor and to be mounted to the front underportion of a trailer to support the same on said fifth-wheel part, comprising an upper fifth-wheel part adapted to engage the said lower fifth-wheel part in a fifth-wheel arrangement, a pair of pivot bracket members adapted to be mounted to the front under-portion of a said trailer, the axes of said pivot bracket members being spaced apart and disposed substantially parallel to each other, a pair of parallel and downwardly inclined link members having their lower ends pivotally connected at spaced locations to said upper fifth-wheel part and their upper ends pivotally connected to said bracket members, said link members, bracket members and upper fifth-wheel part being arranged in a parallelogram whereby the relationship of the distances of the bracket members from the upper fifth-wheel part is maintained upon pivotal swinging of the said link members, and resilient means operatively connected to said link members and biased to resiliently oppose swinging of the link members in a direction to permit movement of said bracket members toward said upper fifth-wheel part.

3. A device adapted to engage a lower fifth-wheel part carried by an automotive tractor and to be mounted to the front under-portion of a trailer to support the same on said fifth-wheel part, comprising an upper fifth-wheel part adapted to engage the said lower fifth-wheel part in a fifth-wheel arrangement, a pair of pivot bracket members adapted to be mounted to the front under-portion of a said trailer, the axes of said pivot members being spaced apart and disposed substantially parallel to each other, a pair of parallel and downwardly inclined link members having their lower ends pivotally connected at spaced locations to said upper fifth-wheel part and their upper ends pivotally connected to said bracket members, said link members, bracket members and upper fifth-wheel part being arranged in a parallelogram whereby the relationship of the distances of the bracket members from the upper fifth-wheel part is maintained upon pivotal swinging of the said link members, resilient means operatively connected to said link members and biased to resiliently oppose swinging of the link members in a direciton to permit movement of said bracket members toward said upper fifth-wheel part, and dampening means operatively connected to said link members to dampen pivoted swinging of the link members in a direction permitting movement of said bracket members away from said upper fifth-wheel part.

4. A spring assembly for a fifth-wheel connection between an automotive tractor and a trailer, said tractor having a lower fifth-wheel part carried thereby for supporting the forward portion of a said trailer, comprising in combination an upper fifth-wheel part adapted to engage said lower fifth-wheel part in a fifth-wheel operating arrangement, mounting means adapted to be mounted to a said trailer adjacent the forward end thereof, a pair of parallel link members extending between said mounting means and said upper fifth-wheel part, a first pair of pivot connections pivotally connecting the lower ends, respectively, of said link members to said upper fifth-wheel part, the axes of said first pair of pivot connections being spaced apart longitudinally of said upper fifth-wheel part and disposed substantially parallel to each other, a second pair of pivot connections pivotally connecting the upper ends, respectively, of said link members to said mounting means and maintaining the parallelism of said link members upon pivotal swinging of the link members about said pivot connections, a pair of torsion rods non-rotatively secured to said link members, respectively, and disposed axially of said pivot connections, respectively, of said second pair of pivot connections, said torsion rods extending to locations spaced from said link members, respectively, and anchoring means connected to each of said torsion rods at said spaced locations and disposed to resist at said spaced locations torque of said rods induced thereto by pivotal swinging of said link members on movement of said mounting means toward said upper fifth-wheel part.

5. A spring assembly for a fifth-wheel connection between an automotive tractor and a trailer, said tractor having a lower fifth-wheel part carried thereby for supporting the forward portion of a said trailer, comprising in combination an upper fifth-wheel part adapted to engage said lower fifth-wheel part in a fifth-wheel operating arrangement, mounting means adapted to be mounted to a said trailer adjacent the forward end thereof, a pair of parallel link members extending between said mounting means and said upper fifth-wheel part, a first pair of pivot connections pivotally connecting the lower ends, respectively, of said link members to said upper fifth-wheel part, the axes of said first pair of pivot connections being spaced apart longitudinally of said upper fifth-wheel part and disposed substantially parallel to each other, a second pair of pivot connections pivotally connecting the upper ends, respectively, of said link members to said mounting means and maintaining the parallelism of said link members upon pivotal swinging of the link members about said pivot connections, a pair of torsion rods non-rotatively secured to said link members, respectively, and disposed axially of said pivot connections, respectively, of said second pair of pivot connections, said torsion rods extending to locations spaced from said link members, respectively, anchoring means connected to each of said torsion rods at said spaced locations and disposed to resist at said spaced locations torque of said rods induced thereto by pivotal swinging of said link members on movement of said mounting means toward said upper fifth-wheel part, and dampening means operatively connected to said link members for dampening pivotal swinging of said link members on movement of said mounting means away from said upper fifth-wheel part.

6. A spring assembly for a fifth-wheel connection between an automotive tractor and a trailer, said tractor having a lower fifth-wheel part and said trailer having a forward bottom portion adapted to be positioned above said lower fifth-wheel part, comprising in combination an upper fifth-wheel part adapted to engage said lower fifth-wheel part in a fifth-wheel operating arrangement, mounting means adapted to be mounted to said forward bottom portion of the trailer, a pair of parallel link members extending between said mounting means and said upper fifth-wheel part, a pair of pivot connections connecting the lower ends, respectively, of said link members to said upper fifth-wheel part, the axes of said first pair of pivot connections being spaced apart and disposed substantially parallel to each other, a second pair of pivot connections pivotally connecting the upper ends, respectively, of said link members to said mounting means, the axes of said second pair of pivot connections being spaced apart and disposed substantially parallel to each other, the spacing of the axes of the first pair of pivot connections and the spacing of the axes of the second pair of pivot connections providing for maintaining the parallelism of said link members upon swinging of the link members on said pivot connections, movement of said upper fifth-wheel part and said mounting means toward each other causing pivotal swinging of the link members in a first direction, a pair of resilient torsion rods non-rotatively secured to said link members, respectively, the axes of said torsion rods coinciding with the axes of the pivot connections, respectively, of said second pair of pivot connections, pivotal swinging of said link members rotating said torsion rods on their respective axes, and anchoring means engaging the respective torsion rods at an axial distance along the torsion rods from the respective link members to restrain rotation at said axial distance of the respective torsion rods in said first direction resulting from movement of said upper fifth-wheel part and said mounting means toward each other.

7. A spring assembly for a fifth-wheel connection between an automotive tractor and a trailer, said tractor having a lower fifth-wheel part and said trailer having a forward bottom portion adapted to be positioned above said lower fifth-wheel part, comprising in combination an upper fifth-wheel part adapted to engage said lower fifth-wheel part in a fifth-wheel operative arrangement, mounting means adapted to be mounted to said forward bottom portion of the trailer, a pair of parallel link members extending between said mounting means and said upper fifth-wheel part, a pair of pivot connections connecting the lower ends, respectively, of said link members to said upper fifth-wheel part, the axes of said first pair of pivot connections being spaced apart and disposed substantially parallel to each other, a second pair of pivot connections pivotally connecting the upper ends, respectively, of said link members to said mounting means, the axes of said second pair of pivot connections being spaced apart and disposed substantially parallel to each other, the spacing of the axes of the first pair of pivot connections and the spacing of the axes of the second pair of pivot connections providing for maintaining the parallelism of said link members upon swinging of the link members on said pivot connections, movement of said upper fifth-wheel part and said mounting means toward each other causing pivotal swinging of the link members in a first direction, a pair of resilient torsion rods non-rotatively secured to said link members, respectively, the axes of said torsion rods coinciding with the axes of the pivot connections, respectively, of said second pair of pivot connections, pivotal swinging of said link members rotating said torsion rods on their respective axes, anchoring means engaging the respective torsion rods at an axial distance along the torsion rods from the respective link members to restrain rotation at said axial distance of the respective torsion rods in said first direction resulting from movement of said upper fifth-wheel part and said mounting means toward each other, and dampening means for dampening the pivotal swinging of said link members in an opposite direction upon movement of the upper fifth-wheel part and mounting means away from each other, said dampening means being operatively connected to said link members.

8. In a mounting assembly for a first fifth-wheel part carried by a trailer for engagement in a fifth-wheel arrangement with a second fifth-wheel part carried by a tractor, comprising the combination of mounting means adapted to be mounted to said trailer, parallel link members pivotally connected at their lower ends to the said first fifth-wheel and at their upper ends to the said mounting means in parallelogram arrangement causing pivotal swinging of the link members in one direction upon movement of the mounting means and first fifth-wheel part toward each other and an opposite direction upon movement of the mounting means and first fifth-wheel away from each other, resilient torsion rod means non-rotatively connected to said link members to axially rotate upon pivotal swinging of said link members, and anchoring means connected to said torsion rod means at an axial distance along said torsion rod means from said link members to restrain torque of said torsion rod means at said axial distance upon rotation of said torsion rod means by pivotal swinging of said link members in said one direction.

9. In a mounting assembly for a first fifth-wheel part carried by a trailer for engagement in a fifth-wheel arrangement with a second fifth-wheel part carried by a tractor, comprising the combination of mounting means adapted to be mounted to said trailer, parallel link members pivotally connected at their lower ends to the said first fifth-wheel part and at their upper ends to the said mounting means in parallelogram arrangement causing pivotal swinging of the link members in one direction upon movement of the mounting means and first fifth-wheel part toward each other and in an opposite direction upon movement of the mounting means and first fifth-wheel away from each other, resilient torsion rod means non-rotatively connected to said link members to axially rotate upon pivotally swinging of said link members, anchoring means connected to said torsion rod means at an axial distance along said torsion rod means from said link members to restrain torque of said torsion rod means at said axial distance upon rotation of said torsion rod means by pivotal swinging of said link members in said one direction, and dampening means operatively connected to said link members for dampening the pivotal swinging of said link members in said opposite direction.

10. In a fifth-wheel assembly for connection between a tractor and trailer having the lower part of the fifth-wheel mounted on said tractor and the upper part of the fifth-wheel mounted on the trailer comprising in combination parallelogram link means pivotally connecting said trailer and said upper fifth-wheel part to provide for movement of said upper fifth-wheel part toward and away from said trailer and maintained in a plane parallel to said trailer, and torsion rod means operatively connected to said link means for resiliently restraining movement of said upper fifth-wheel part and trailer toward each other.

11. In a fifth-wheel assembly for connection between a tractor and trailer having the lower part of the fifth-wheel mounted on said tractor and the upper part of the fifth-wheel mounted on the trailer comprising in combination parallelogram link means pivotally connecting said trailer and said upper fifth-wheel part to provide for movement of said upper fifth-wheel part toward and away from said trailer and maintained in a plane parallel to said trailer, torsion rod means operatively connected to said link means for resiliently restraining movement of said upper fifth-wheel part and trailer toward each other, and dampening means operatively connected to said link means for dampening movement of said upper fifth-wheel part and trailer away from each other.

12. The combination of a table member adapted to interengage in fifth-wheel arrangement a supporting plate carried by a tractor, a pair of U-shaped members, first pivot means pivotally connecting the ends of the arms of said U-shaped members to said table member, the axes of the said first pivot means connecting each U-shaped member to the table member being parallel and spaced apart longitudinally of said table member, second pivot means pivotally connecting the bases of said U-shaped members to said trailer and spaced and arranged to maintain said U-shaped members parallel to each other upon pivotal swinging on said first and second pivot means as said supporting plate and trailer are moved toward and away from each other, a pair of torsion rods each non-rotatively engaged to a said U-shaped member and having its axis coinciding with the axis of the second pivot means connecting the base of said U-shaped member to said trailer, said torsion rods extending laterally of said trailer from the respective U-shaped members, torque-resisting members each connected to each said torsion rod at an axial distance from the respective U-shaped members and arranged to resist torque of said torsion rods in a first direction, movement of said trailer and table member toward each other pivotally swinging said U-shaped members and resiliently rotating said torsion rod at said U-shaped members in said first direction and in opposition to said torque-resisting members, a pair of torque-transmitting rods each non-rotatively connected to a said U-shaped member and having its axis coinciding with the axis of the said second pivot means connecting the base of said U-shaped member to said trailer, and dampening members each connected to a said torque-transmitting rod at an axial distance from the respective U-shaped members and arranged to dampen torque of said torque-transmitting rods in an opposite direction.

13. A spring assembly for a fifth-wheel connection between an automotive tractor and a trailer, said tractor having a lower fifth-wheel part carried thereby for supporting the forward portion of a said trailer, comprising in combination an upper fifth-wheel part adapted to engage said lower fifth-wheel part in a fifth-wheel operating arrangement, mounting means adapted to be mounted to a said trailer adjacent the forward end thereof, a pair of parallel link members extending between said mounting means and said upper fifth-wheel part, a first pair of pivot connections pivotally connecting the lower ends, respectively, of said link members to said upper fifth-wheel part, the axes of said first pair of pivot connections being spaced apart longitudinally of said upper fifth-wheel part and disposed substantially parallel to each other, a second pair of pivot connections pivotally connecting the upper ends, respectively, of said link members to said mounting means and maintaining the parallelism of said link members upon pivotal swinging of the link members about said pivot connections, a pair of torsion rods non-rotatively secured to said link members, respectively, and disposed axially of said pivot connections, respectively, of said second pair of pivot connections, said torsion rods extending to locations spaced from said link members, respectively, connecting means interconnecting said torsion rods to translate torque of one torsion rod to the other torsion rod at their ends adjacent said link members, respectively, and anchoring means connected to at least one of said torsion rods at a said spaced location and disposed to resist at said spaced location torque of said at least one torsion rod induced thereto by pivotal swinging of said link members on movement of said mounting means toward said upper fifth-wheel part.

14. A spring assembly for a fifth-wheel connection between an automotive tractor and a trailer, said tractor having a lower fifth-wheel part and said trailer having a forward bottom portion adapted to be positioned above said lower fifth-wheel part, comprising in combination an upper fifth-wheel part adapted to engage said lower fifth-wheel part in a fifth-wheel operating arrangement, mounting means adapted to be mounted to said forward bottom portion of the trailer, a pair of parallel link members extending between said mounting means and said upper fifth-wheel part, a pair of pivot connections connecting the lower ends, respectively, of said link members to said upper fifth-wheel part, the axes of said first pair of pivot connections being spaced apart and disposed substantially parallel to each other, a second pair of pivot connections pivotally connecting the upper ends, respectively, of said link members to said mounting means, the axes of said second pair of pivot connections being spaced apart and disposed substantially parallel to each other, the spacing of the axes of the first pair of pivot connections and the spacing of the axes of the second pair of pivot connections providing for maintaining the parallelism of said link members upon swinging of the link members on said pivot connections, movement of said upper fifth-wheel part and said mounting means toward each other causing pivotal swinging of the link members in a first direction, a pair of arm members non-rotatively secured to said link members adjacent said second pair of pivot connections, respectively, to swing in arcs about the axes of said second pair of pivot connections, respectively, as said link members pivotally swing, a connecting rod pivotally connecting said arm members at a distance from said axes, respectively, of said second pair of pivot connections, whereby movement swinging one arm member is translated into movement swinging the other arm member, torsion rod means operatively connected to said link members to be rotated by the pivotal swinging of said link members and the swinging of said arm members, and anchoring means associated with said torsion rod means for resisting rotation of the torsion rod means at an axial distance along said torsion rod means from said link members.

15. In a mounting assembly for a first fifth-wheel part carried by a trailer for engagement in a fifth-wheel arrangement with a second fifth-wheel part carried by a tractor, comprising the combination of mounting means adapted to be mounted to said trailer, parallel link members pivotally connected at their lower ends to the said first fifth-wheel and at their upper ends to the said mounting means in parallelogram arrangement causing pivotal swinging of the link members in one direction upon movement of the mounting means and first fifth-wheel part toward each other and an opposite direction upon movement of the mounting means and first fifth-wheel part away from each other, a plurality of torsion rods each non-rotatively connected to a said link member to axially rotate upon pivotal swinging of said link members, lever means operatively connecting said torsion rods adjacent said link member to transmit torque between said torsion rods adjacent said link members, and anchoring means connected to said torsion rods at an axial distance along said torsion rods from said link members, said anchoring means being adapted to restrain torque of a said torsion rod at said axial distance upon rotation of said torsion rods by pivotal swinging of said link members in said one direction.

16. In a mounting assembly for a first fifth-wheel part carried by a trailer for engagement in a fifth-wheel arrangement with a second fifth-wheel part carried by a tractor, comprising the combination of mounting means adapted to be mounted to said tractor, parallel link members pivotally connected at their lower ends to the said first fifth-wheel and at their upper ends to the said mounting means in parallelogram arrangement causing pivotal swinging of the link members in one direction upon movement of the mounting means and first fifth-wheel part toward each other and an opposite direction upon movement of the mounting means and first fifth-wheel away from each other, a plurality of torsion rods each non-rotatively connected to a said link member to axially rotate upon pivotal swinging of said link members, lever means operatively connecting said torsion rods adjacent said link member to transmit torque between said torsion rods adjacent said link members, anchoring means connected to said torsion rods at an axial distance along said torsion rods from said link members, said anchoring means being adapted to restrain torque of a said torsion rod at said axial distance upon rotation of said torsion rods by pivotal swinging of said link members in said one direction, and dampening means operatively connected to said lever means for dampening movement of said lever means and the torque of said torsion rods upon pivotal swinging of said link member in said opposite direction.

17. In a fifth-wheel coupling device for coupling an automotive tractor and trailer, said tractor having a supporting plate carried thereon, the supporting plate being adapted to engage a king-pin, the improvement of a table member adapted to engage the top surface of said supporting plate to be supported thereon and to carry a king-pin adapted to engage said supporting plate, a pair of pivot supports adapted to be mounted to said trailer at the bottom thereof and adjacent the forward end of said trailer, the axes of said pivot supports being parallel and spaced apart longitudinally, and disposed transversely, of the axis of said trailer, a sleeve member pivotally carried by each said pivot support and concentric with the axis thereof, a pin member positioned in each of said sleeve members and concentric with the axis thereof, a pair of parallel radius members each pivotally connected at one end to said table member and rigidly connected at an opposite end to said pin members, respectively, said radius members, table member and pin members being arranged in a parallelogram to maintain parallel relationship of said table member and said pin members, each said sleeve member and associated pin member having opposed non-concentric inner and outer walls defining a non-circular space therebetween, rubber-like resiliently distortable material positioned in said spaces, respectively, and arranged relative to said inner and outer walls to be resiliently distorted upon relative rotation between each pin member and associated sleeve member, the swinging of said radius members on the axes, respectively, of said pivot supports in a direction moving the pivot supports toward said table member being resiliently opposed by the said resilient distortion of said material upon said relative rotation, and adjusting means for adjusting the position of said sleeve members in said pivot supports around the respective axes thereof for fixing the reference for relative rotation between said sleeve members and pin members.

18. A device adapted to engage a lower fifth-wheel part carried by an automotive tractor and to be mounted to the front underportion of a trailer to support the same on said fifth-wheel part, comprising an upper fifth-wheel part adapted to engage the said lower fifth-wheel part in a fifth-wheel arrangement, a pair of pivot bracket members adapted to be mounted to the front under-portion of a said trailer, the axes of said pivot bracket members being spaced apart and disposed substantially parallel to each other, a pair of parallel and downwardly inclined link members having their lower ends pivotally connected at spaced locations to said upper fifth-wheel part and their upper ends pivotally connected to said bracket members, said link members, bracket members and upper fifth-wheel part being arranged in a parallelogram whereby the relationship of the distances of the bracket members from the upper fifth-wheel part is maintained upon pivotal swinging of the said link members, and a pair of devices for resiliently resisting pivoting of the upper ends of the link members and associated bracket members, each of said devises comprising an inner member and outer member disposed concentric with the axes of the said pivot connections with the bracket members, one of said inner and outer members being movable with a respective link member and the other of said inner and outer members being adapted to be fixed relative to said respective link member, said inner and outer members having opposed walls defining a space therebetween, and resiliently distortable material positioned in said space and engaging the said opposed walls to resist movement about said axes upon rotation of one of said inner and outer members relative to each other.

19. In a fifth-wheel assembly for connection between a tractor and trailer having the lower part of the fifth-wheel mounted on said tractor and the upper part of the fifth-wheel mounted on the trailer comprising in combination parallelogram link means pivotally connecting said trailer and said upper fifth-wheel part to provide for movement of said upper fifth-wheel part toward and away from said trailer and maintained in a plane parallel to said trailer, pivot means operatively interconnecting said link means and trailer, said pivot means each including inner and outer members disposed concentric to each other and mounted for rotation of one relative to the other, said inner and outer members having non-cylindrical opposed walls to define a non-annular space therebetween, and resiliently distortable rubber-like members disposed in said space to be resiliently distorted by said opposed walls upon rotation of one member relative to the other member, said resilient distortion opposing said rotation for resiliently restraining movement of said upper fifth-wheel part and trailer toward each other.

20. In a fifth-wheel assembly for connection between a tractor and trailer having the lower part of the fifth-wheel mounted on said tractor and the upper part of the fifth-wheel mounted on the trailer, comprising in combination parallelogram link means pivotally connecting said trailer and said upper fifth-wheel part to provide for movement of said upper fifth-wheel part towards and away from said trailer upon swinging of the link means, resilient pivot devices providing the pivotal connection between the link means and one of said trailer and upper fifth-wheel part to provide resilient resistance to movement of the upper fifth-wheel part towards said trailer, said resilient pivot devices each comprising concentrically mounted inner and outer members, one of said members being rotatable relative to the other about the axis of the device upon swinging of said link means, said members having non-circular opposed walls, said walls being out of phase with each other in one position of the link means and being movable toward a position in phase with each other upon swinging of said link means from said one position, and a plurality of resiliently distortable rubber-like members positioned between said opposed walls to be resiliently distorted by compression between said opposed falls upon rotation of one of said members from an out-of-phase position of said walls toward an in-phase position of said walls, said resilient distortion to rotation resiliently resisting the swinging of the link means and movement of the upper fifth-wheel part toward the trailer.

21. In a fifth-wheel assembly for connection between a tractor and trailer having the lower part of the fifth-wheel mounted on said tractor and the upper part of the fifth-wheel mounted on the trailer, comprising in combination parallel link means, pivot connecting means interconnecting the said link means and said trailer and upper fifth-wheel part to provide for movement of the upper fifth-wheel part toward and away from the said trailer and maintained in a plane parallel to said trailer, the pivot connecting means interconnecting the link means and one of said upper fifth-wheel part and trailer including resiliently distortable rubber-like means mounted to resiliently resist such pivotal action of the pivot connecting means as permits movement of the upper fifth-wheel part toward said trailer.

22. In a fifth-wheel assembly for connection between a tractor and trailer having the lower part of the fifth-wheel mounted on said tractor and the upper part of the fifth-wheel mounted on the trailer, the combination of a pair of parallel sleeve members carried by and disposed transversely of said trailer and spaced longitudinally thereof, a pair of pivot pin members concentrically mounted in the respective sleeve members, said sleeve members and pivot pin members having opposed walls defining a space therebetween and concentric with the axis of the pivot pin member, said opposed walls being of polygonal shape in cross-section, elastic rubber-like elements disposed in said space and engaging said opposed walls to resiliently urge the opposed walls out of phase with each other, and parallel link means rigidly connected to said pivot pin members, respectively, and pivotally connected to said upper fifth-wheel part to provide for movement of said upper fifth-wheel part toward and away from said trailer and maintenance of the upper fifth-wheel part parallel to said trailer, pivoting of the pivot pin members in said sleeve members upon movement of the fifth-wheel part toward the trailer being resiliently opposed by said elastic rubber-like elements resiliently urging said opposed walls out of phase.

23. In a fifth-wheel assembly for connection between a tractor and trailer having the lower part of the fifth-wheel mounted on said tractor and the upper part of the fifth-wheel mounted on the trailer, the combination of a pair of parallel sleeve members carried by and disposed transversely of said trailer and spaced longitudinally thereof, a pair of pivot pin members concentrically mounted in the respective sleeve members, said sleeve members and pivot pin members having opposed walls defining a space therebetween and concentric with the axis of the pivot pin member, said opposed walls being of polygonal shape in cross-section, elastic rubber-like elements disposed in said space and engaging said opposed walls to resiliently urge the opposed walls out of phase with each other, parallel link means rigidly connected to said pivot pin members, respectively, and pivotally connected to said upper fifth-wheel part to provide for movement of said upper fifth-wheel part toward and away from said trailer and maintenance of the upper fifth-wheel part parallel to said trailer, pivoting of the pivot pin members in said sleeve members upon movement of the fifth-wheel part toward the trailer being resiliently opposed by said elastic rubber-like elements resiliently urging said opposed walls out of phase, and adjusting means for adjustably fixing the rotational reference position of said sleeve members relative to said pivot pin members.

24. In a fifth-wheel assembly for connection between a tractor and trailer having the upper fifth-wheel part carried by the trailer, the combination of parallelogram link means extending between the upper fifth-wheel part and the trailer for maintaining a parallel relationship between the fifth-wheel part and trailer, first pivot means pivotally connecting the upper fifth-wheel part and said link means, and second pivot means pivotally connecting the trailer and said link means, one of said first and second pivot means including concentric pivot pin means and sleeve means and rubber-like elastic elements engaging said pivot pin means and sleeve means for resiliently resisting pivotal movement therebetween and thereby cushioning movement of the upper fifth-wheel part toward said trailer.

25. In a fifth-wheel assembly for connection between a tractor and trailer having the upper fifth-wheel part carried by the trailer, the combination of parallelogram link means extending between the upper fifth-wheel part and the trailer for maintaining a parallel relationship between the fifth-wheel part and trailer, first pivot means pivotally connecting the upper fifth-wheel part and said link means, second pivot means pivotally connecting the trailer and said link means, one of said first and second pivot means including concentric pivot pin means and sleeve means and rubber-like elastic elements engaging said pivot pin means and sleeve means for resiliently resisting pivotal movement therebetween and thereby cushioning movement of the upper fifth-wheel part toward said trailer, and adjusting means for adjusting the rotational reference position of said sleeve means relative to said pivot pin means.

References Cited in the file of this patent

UNITED STATES PATENTS

| | | |
|---|---|---|
| 645,766 | Abbott | Mar. 20, 1900 |
| 1,245,277 | Shadbolt | Nov. 6, 1957 |